United States Patent
Tidland et al.

Patent Number: 5,958,494
Date of Patent: Sep. 28, 1999

[54] ROASTING SYSTEM WITH HEAT RECYCLER

[75] Inventors: John W. Tidland, Vancouver, Wash.; Don S. Welch, 15616 NW. St. Andrews Dr., Portland, Oreg. 97229

[73] Assignee: Don S. Welch, Portland, Oreg.

[21] Appl. No.: 09/007,560

[22] Filed: Jan. 15, 1998

Related U.S. Application Data

[60] Provisional application No. 60/034,951, Jan. 17, 1997.

[51] Int. Cl.$^6$ ............................................. A23F 5/04
[52] U.S. Cl. .................. 426/466; 426/467; 426/486; 426/523; 99/286
[58] Field of Search .................. 426/443, 466, 426/467, 523, 520, 524, 486; 99/286, 281, 298, 303; 34/108

[56] References Cited

U.S. PATENT DOCUMENTS

| | | | |
|---|---|---|---|
| 3,599,401 | 8/1971 | Rich et al. ................................ | 55/471 |
| 4,192,081 | 3/1980 | Erickson et al. . | |
| 4,494,314 | 1/1985 | Gell, Jr. ................................... | 34/10 |
| 4,642,906 | 2/1987 | Kaatze et al. ............................ | 34/13 |
| 4,860,461 | 8/1989 | Tamaki et al. ........................... | 34/68 |
| 5,096,725 | 3/1992 | Kim ...................................... | 426/233 |
| 5,134,263 | 7/1992 | Smith et al. .................... | 219/10.55 M |
| 5,185,171 | 2/1993 | Bersten .................................. | 426/467 |
| 5,257,574 | 11/1993 | Hiromichi ............................... | 99/483 |
| 5,394,623 | 3/1995 | Sewell .................................... | 34/544 |
| 5,632,098 | 5/1997 | Finch . | |
| 5,651,192 | 7/1997 | Horwitz . | |
| 5,749,288 | 5/1998 | Skaling .................................. | 99/483 |

*Primary Examiner*—David Lacey
*Assistant Examiner*—Drew Becker
*Attorney, Agent, or Firm*—Marger Johnson & McCollom, P.C.

[57] ABSTRACT

A roasting system includes a roasting chamber having an air infeed vent for receiving air and a flue for directing exhaust air from the roasting chamber. An air reconditioning system coupled between the air infeed vent and the flue eliminates the need for external venting. The air reconditioning system includes a heater for heating the air received in the roasting chamber through the infeed vent and an air filtering system. A fan draws the exhaust air from the roasting chamber, passes the exhaust air through the air filtering system and past the heater and then recirculates the filtered and reheated air back into the roasting chamber. Continuously filtering recirculated air allows the roasting system to be placed in retail coffee shops without requiring external ventilation or producing objectionable odors. By reusing the heated air from the roasting chamber, the roasting system is also more energy efficient than current coffee roasting systems and allows the roasting system to be operated in non-industrial locations.

30 Claims, 6 Drawing Sheets

ROASTING SYSTEM WITH HEAT RECYCLER

I claim priority under 35 USC 119(e) to Provisional Application No. 60/034,951 filed Jan. 17, 1997.

BACKGROUND OF THE INVENTION

This invention relates to coffee bean roasting systems and more specifically to a method and apparatus for increasing the energy efficiency and utilization of roasting systems while improving the quality of the roasted coffee beans.

There are two primary methods for roasting coffee beans. Drum roasting uses a heating technique similar to common clothes dryers. Green coffee beans are placed in a round drum. Heating elements heat both the drum and the air inside the drum. As the drum rotates, the coffee beans are circulated inside the rotating drum. The heat from the inside walls of the drum is transferred to the coffee beans. As the coffee beans continue to roll inside the drum, the coffee beans are heated and scorched, changing from a green state to a roasted condition. To generate darker roasts, the coffee beans are heated in the drum at a higher temperature.

A fluid bed roaster blows air up from the bottom end of a roasting chamber. The air raises the green coffee beans up on a bed of hot air causing the beans to circulate inside the chamber. U.S. Pat. No. 3,964,175 to Sivetz shows a fluid bed coffee roasting system. In Sivetz, air is heated to a selected temperature and the heated air roasting the coffee beans primarily by convection. The beans are roasted secondarily by conduction of heat from bean to bean and from conduction of heat from the inside walls of the roasting chamber to the coffee beans.

Coffee roasting systems generate a substantial amount of smoke and chaff when bean temperatures go over 300 degrees. External ventilation systems are needed to filter the smoke and other pollutants away from the room where the coffee roasting is taking place. After-burners are used to burn-off some of the smoke and pollutants before venting coffee bean exhaust to the outside environment. After-burners significantly increase the amount of energy used during each roasting session. After-burners are also not very effective in removing tar and other pollutants from the coffee bean exhaust. Thus, current roasting systems must be operated in industrial locations where objectionable exhaust fumes cannot be inhaled by retail coffee consumers.

Roasting machines must produce consistent bean roasts for a wide variety of desired bean flavors. Special skill is required to reproduce consistent coffee bean roasts with current coffee roasting machines. A roast-master must visually inspect each batch of roasted coffee beans for a desired bean darkness. If lighting in the roasting room changes, the perceived color of the roasted coffee beans changes. If not circulated evenly inside the roasting chamber, coffee beans will not roast evenly. Thus, even a skilled roast-master has difficulty reproducing consistent coffee roasts.

U.S. Pat. No. 3,964,175 to Sivetz shows in FIGS. 3 and 8, the circulation pattern for coffee beans in two different sized roasting chambers. A majority of the coffee beans follow a circulation pattern that first travels up the entire vertical length of a front wall then down an inclined back wall. A smaller number of coffee beans are suspended in the center of the chamber making minimal contact with the front and back walls. The coffee beans consistently riding against the inside walls of the roasting chamber have a higher likelihood of burning or becoming darker than the coffee beans that spend a substantial portion of time circulating in the center of the chamber. Thus, the coffee beans will not have a consistent roast condition.

The water content of green coffee beans can differ. Different batches of coffee beans may, therefore, require different amounts of heat to reach the same temperature. Sivetz uses a thermometer to measure the air temperature inside the roasting chamber, but does not measure the actual temperature of the coffee beans. Thus, two different batches of coffee beans, roasted at the same air temperature for the same amount of time, might produce two substantially different roasting results.

Accordingly, a need remains for a low pollutant and energy efficient roasting system that produces more consistent coffee bean roasts.

SUMMARY OF THE INVENTION

A roasting system includes a roasting chamber having an air infeed vent for receiving air and a flue for directing exhaust air from the roasting chamber. An air reconditioning system is coupled between the air infeed vent and the flue. The air reconditioning system eliminates the need for external venting. The air reconditioning system includes a heater for heating the air blown into the roasting chamber through the infeed vent and an air filtering system. A fan draws the exhaust air from the roasting chamber through the air filtering system and past the heater. The filtered and reheated air is then recirculated back into the roasting chamber.

The air filtering system is located above the heater and removes pollutants from the exhaust from the roasting chamber flue. The air filtering system includes a multi-stage filter arrangement. A first filter stage includes coarse fiberglass filters that remove large particulates in the roasting chamber exhaust. A second filter stage uses an electronic filter to remove any micron-sized particulates that still remain in the roasting chamber exhaust. A third filter stage includes a carbon filter that removes odors from the filtered roasting chamber exhaust.

Continuously filtering the recirculated air allows the roasting system to be placed in a room without requiring outside ventilation and without producing objectionable odors. By reusing the heated air from the roasting chamber, the roasting system is also more energy efficient than current coffee roasting systems.

An exhaust section is located above the air recirculating system. An exhaust damper is hinged between the exhaust section and the air reconditioning system. The exhaust damper selectively directs the recirculated air either through the exhaust section back to the air reconditioning system or to the outside environment through an exhaust filter. An ambient air damper is hinged close to the fan and selectively directs ambient air from outside the roasting system into the roasting chamber. An infrared sensor senses radiated heat emitted directly by the coffee beans while in the roasting chamber. The infrared sensor provides a precise measurement of the temperature of the coffee beans, thus improving accuracy of the coffee bean roast.

After the coffee beans reach a predetermined temperature, the exhaust damper prevents the hot air from recirculating through the roasting system and forces the recirculated air out through the exhaust filter to the outside environment. The ambient air damper directs cooler outside air into the roasting chamber. A spray system sprays water up from the air infeed vent into the roasting chamber. The dampers in combination with the water spray quickly cool down the roasted coffee beans, preventing the coffee beans from over roasting.

The roasting chamber includes a bottom end with oppositely inclining bottom sides each aligned at a first angle. Oppositely inclining side walls extend up from the bottom sides and are aligned at a second angle different than the first angle. The dual-angled roasting chamber causes the coffee beans to tumble and circulate more evenly in the roasting chamber.

A trap-door is hinged along an entire bottom end of the roasting chamber. The trap-door pivots downward and away from the bottom end of the roasting chamber. A discharge chute extends around the trap-door and extends downward. The trap-door is automatically pulled open by a piston. The discharge chute then directs the roasted coffee beans quickly out from the roasting chamber.

A perforated screen inside the roasting chamber prevents coffee beans from being blown out the flue and into the cyclone. A pressure sensor in the roasting chamber also indicates if the screen is clogged. Alternatively, a multi-pressure air blower is used to vary the air pressure according to the weight of the coffee beans.

The foregoing and other objects, features and advantages of the invention will become more readily apparent from the following detailed description of a preferred embodiment of the invention which proceeds with reference to the accompanying drawings.

DETAILED DESCRIPTION

Figure 1:
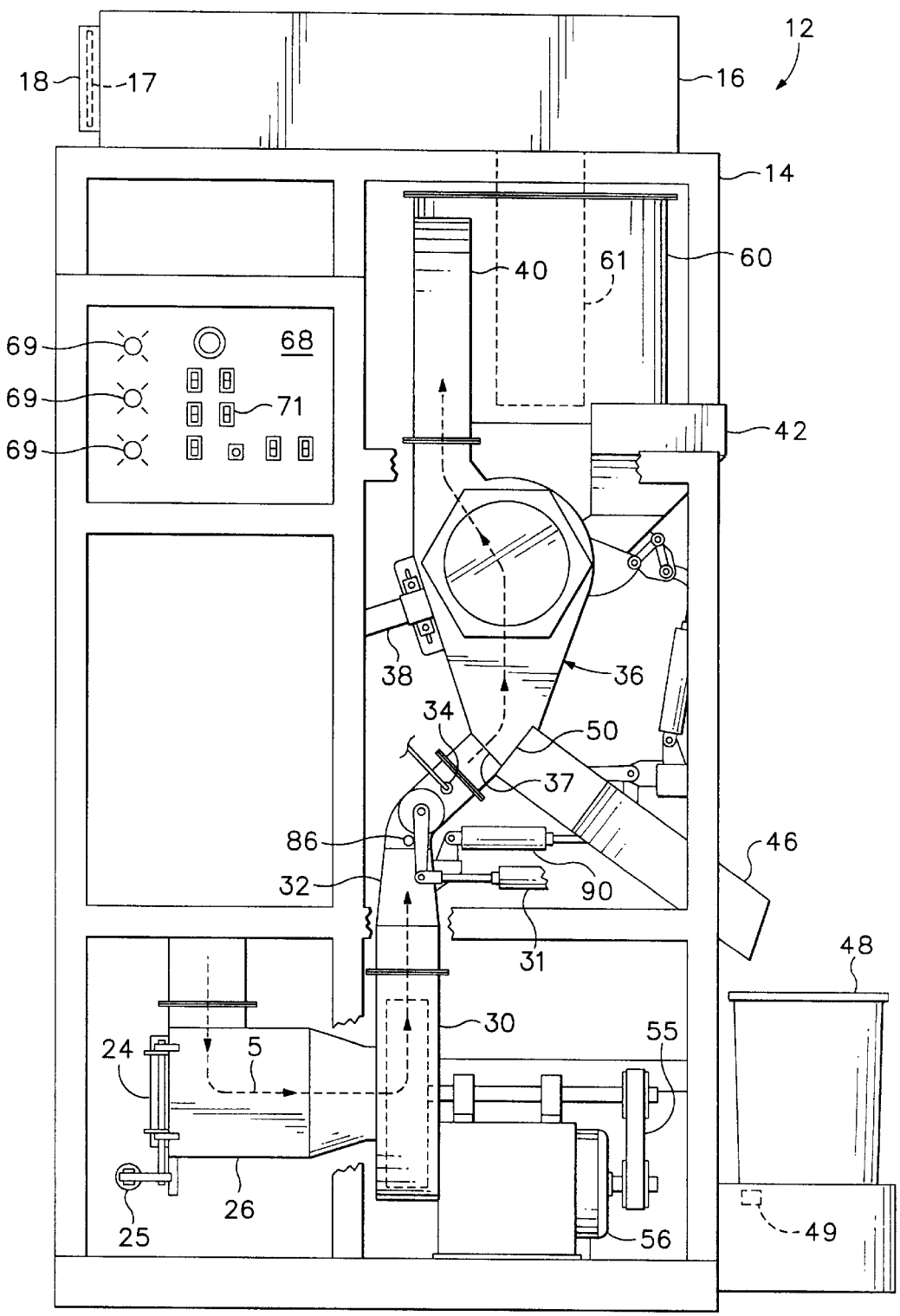
FIG. 1 is a front view of a roasting system according to the present invention.
Figure 5:
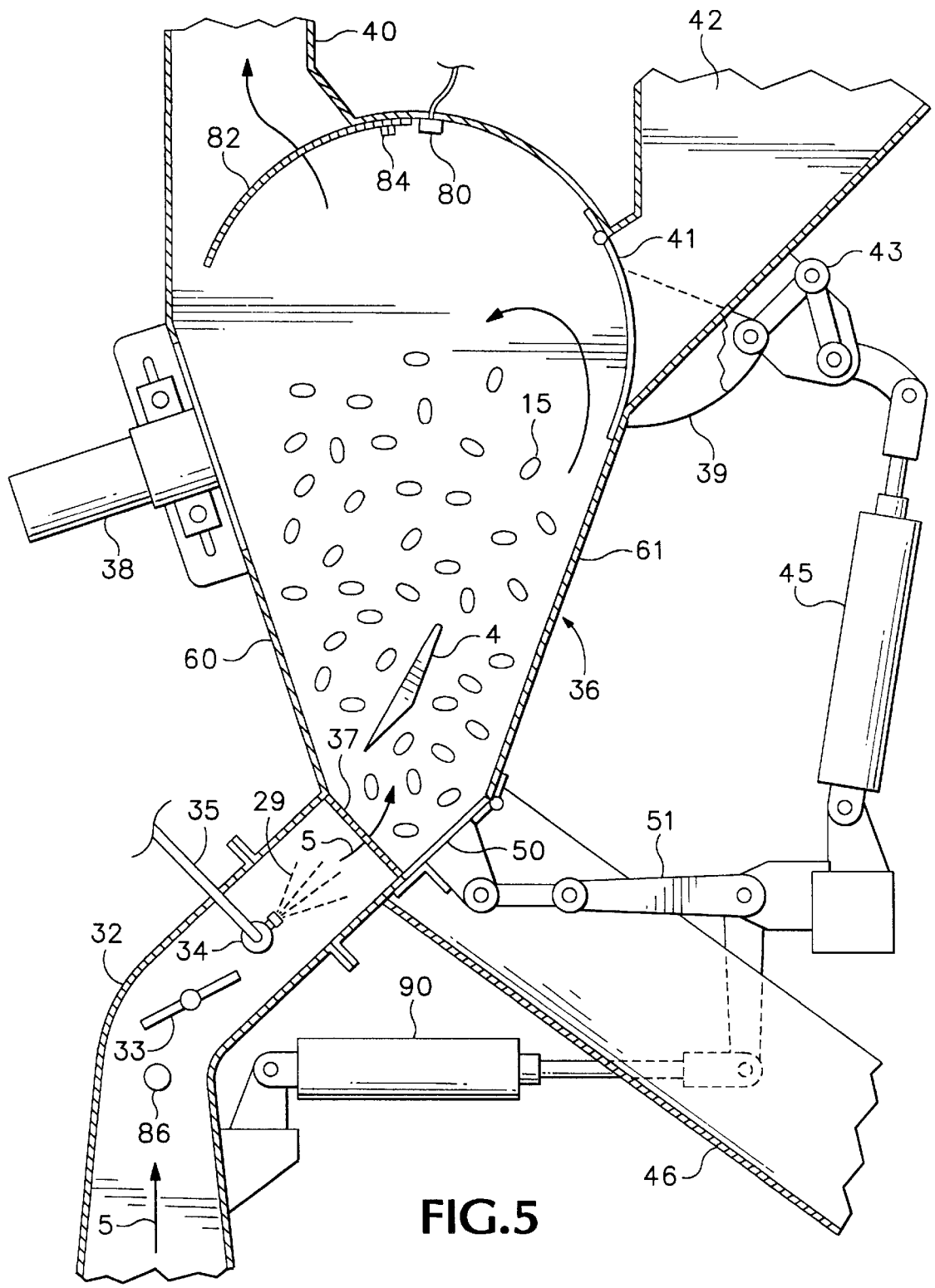
FIG. 5 is a detailed front isolation view of components of the roasting system shown in FIG. 1.
Figure 6:
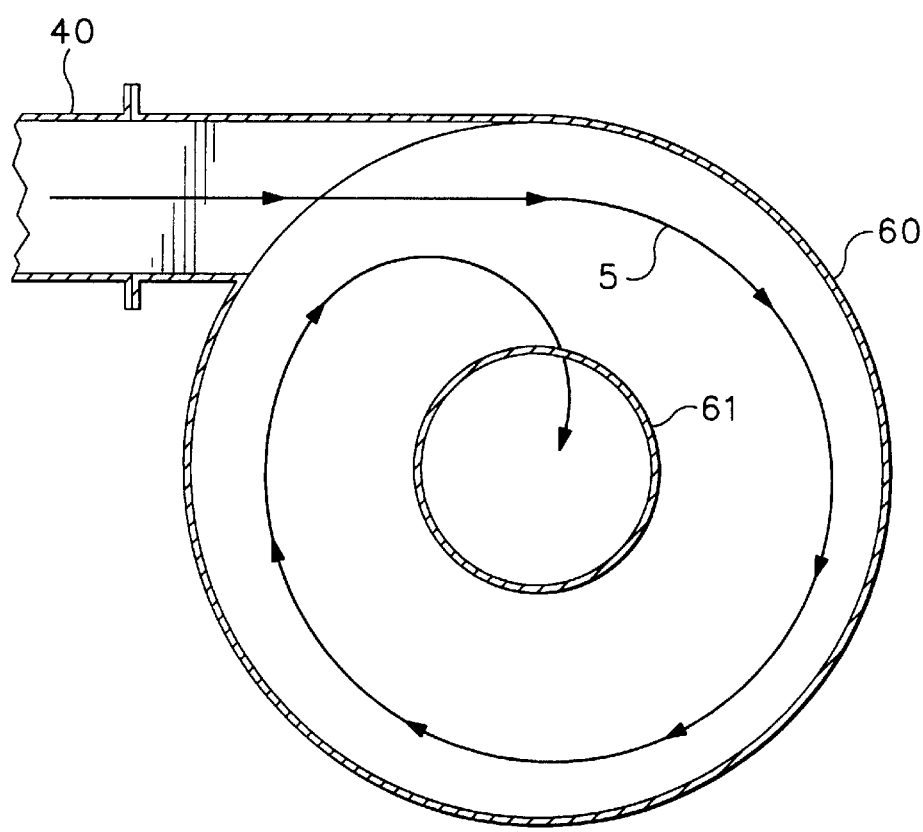
FIG. 6 is a detailed view of a chaff cyclone for the roasting system shown in FIG. 1.

Referring to FIGS. 1 and 5, roasting system 12 includes a frame 14 for supporting a roasting chamber 36 used for roasting green coffee beans 15. An infrared sensor 38 is attached to the side of roasting chamber 36 and measures the heat radiated from the roasting coffee beans 15. One type of infrared sensor and temperature control circuit 38 is the THERMO-DUCER® model THDR-0511, manufactured by Watlow Corporation.

The chamber has a 90 degree "V" shaped bottom end which includes a perforated plate 37. The plate 37 includes a grid of holes that pass blown air into chamber 36. The holes are small enough to prevent coffee beans from falling down into an air duct 32. A nozzle 34 is mounted at one end inside air duct 32 and connected at a second end to a water hose 35. A pressure sensor 86 detects when air is flowing into roasting chamber 36. A damper 33 is pivotally coupled inside air duct 32 and is opened and closed by the extension and retraction of a piston 31. In a closed position, the damper 33 blocks air flow in air duct 32 and in an open position, as shown in FIG. 5, air is permitted to pass through air duct 32.

A trap-door 50 is hinged along one entire side of the "V" bottom end of the roasting chamber 36. A piston 90 is pivotally coupled by hinge assembly 51 to the trap-door 50 (FIG. 5). The extension and retraction of piston 90 opens and closes trap door 50. A perforated screen 82 is detachably coupled to the top end of roasting chamber 36. A pressure sensor 80 is connected next to the screen 82 for detecting when the screen 82 becomes clogged.

An infeed hopper 42 feeds green coffee beans 15 into roasting chamber 36. A hopper door 41 is pivotally coupled to the inside of roasting chamber 36. A hinge assembly 43 is attached to a flange 39 on door 41 and opens and closes door 41 in response to the extension and retraction of piston 45. A discharge chute 46 covers trap-door 50 and extends downward from roasting chamber 36 to position just above a roasted coffee bean receiving bucket 48. A limit switch 49 is activated by the weight of the bucket 48 and prevents the roasting system 12 to start until the bucket 48 is placed underneath discharge chute 46. A flue 40 directs hot air out of the roasting chamber 36 and into chaff cyclone 60.

Figure 2:
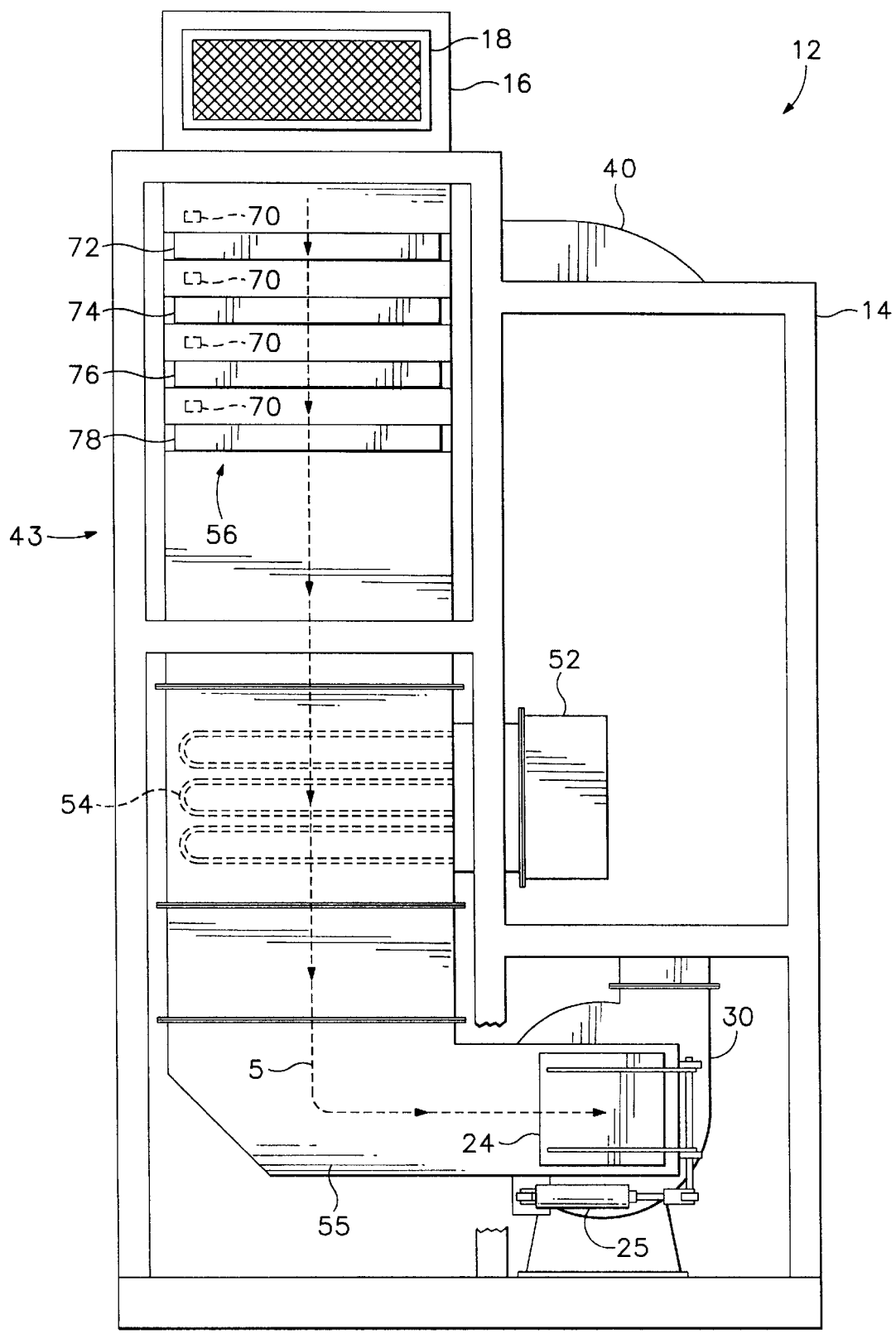
FIG. 2 is left side view of the roasting system shown in FIG. 1.
Figure 3:
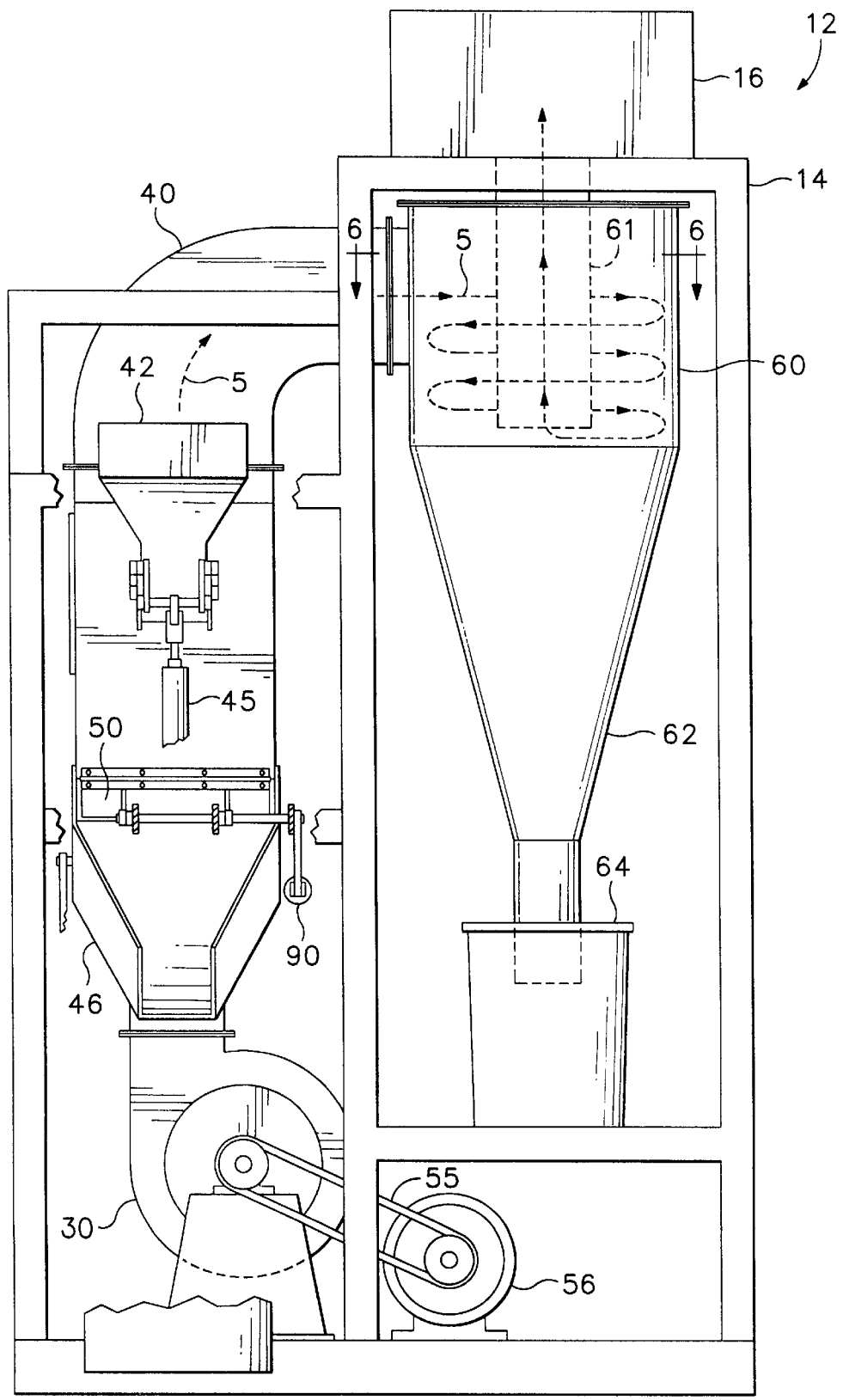
FIG. 3 is right side view of the roasting system shown in FIG. 1.
Figure 4:
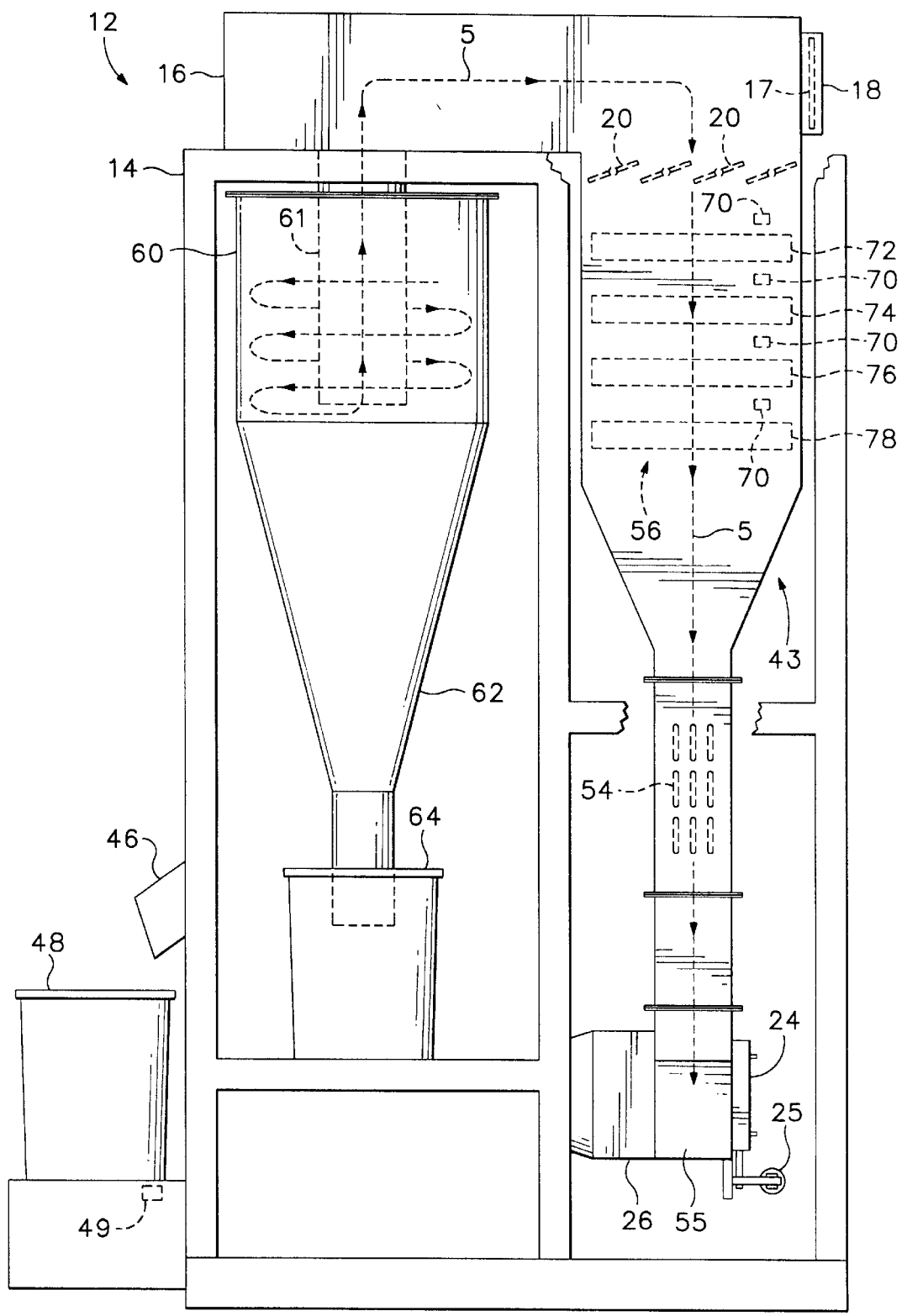
FIG. 4 is a rear view of the roasting system shown in FIG. 1.

Referring to FIGS. 1–3, a funnel 62 is coupled to the bottom of chaff cyclone 60 and extends down to a chaff retaining bucket 64. A pipe 61 extends up through the center of chaff cyclone 60 and is fluidly coupled to an exhaust section 16. The exhaust section 16 extends over air conditioning system 43. Dampers 20 are attached to the bottom of exhaust section 16 and open up into air reconditioning system 43. A coarse filter 17 and an electronic filter 18 cover an opening in exhaust section 16.

The air reconditioning system 43 includes a filtering system 56 which includes multiple filters 72, 74, 76 and 78. The air filtering system includes two coarse fiberglass filters 72 and 74, similar to coarse fiberglass filter 17, used to filter large particulates from the exhaust from chamber 62. A high efficiency electronic filter 76 is used for removing remaining micron-sized pollution particulates. Filter 76 is a high-efficiency electronic filter, such as manufactured by ENVIORSEPT, 3137 Cabinrun Woodbin, Md. 21797. A carbon filter 78 is then used to remove odors from the filtered exhaust from chamber 62. The fiberglass filters 72 and 74 and the carbon filter 78 are similar to filters used in home heating systems.

Heater elements 54 are located below filtering system 56. The heating elements 54 are controlled by an electrical control box 52. The heating elements 56 are commercially available units known to those skilled in the art, similar to the heating units used in home heating systems. Alternatively, a gas heating system can be used.

Pressure sensors 70 are located above filter system 56 and between each individual filter 72, 74, 76 and 78. If any one of the filters 56 becomes sufficiently clogged, a pressure differential is created on the two sides of the filter. The values of the measured pressures from the two sensors 70 on either side of the clogged filter are compared by an electronic measurement circuit in a control panel 68. If the pressure differential is above a given value, the roasting machine will not be allowed to turn on. One of multiple lights 69 in control panel 68 will also be turned on, identifying which filter is clogged. The roasting machine 12 is also prevented from turning on if all filters are not fully seated in respective slots.

An air duct 55 is fluidly joined between the air reconditioning system 43 and a fan 30. A damper 24 is hinged to the air duct 55. The damper 24 is selectively opened and closed by extending and retracting a piston 25. When damper 24 is closed by piston 25, the fan 30 draws air from air reconditioning system 43 into air duct 32. When the damper 24 is opened by piston 25, the fan 30 draws ambient air from outside the roasting system 12 and forces the ambient air into air duct 32. A motor 56 is mechanically coupled to fan 30 by a fan belt 55 and rotates fan 30 for circulating air through the roasting system 12.

In one embodiment, the frame 14, air ducts 55 and 32, flue 40, infeed hopper 42, discharge chute 46, exhaust section 16, chaff cyclone 60 and funnel 62 are all made from sheet metal. The roasting chamber 36 is made from stainless steel. The air ducts 55 and 32, flue 40, 46, exhaust section 16 and chaff cyclone 60 are substantially airtight preventing fumes from the roasting system 12 from escaping into the outside environment. The control panel 68 provides telemetry and circuitry for controlling the various sensors, pneumatic pistons and other devices used for controlling the roasting process. The control circuitry used for controlling operation of the roasting system 12 is well known to those skilled in the art and is therefore, not described in further detail.

Roasting Stages

Referring to FIGS. 1–6, dashed line 5 shows the general direction of air flow through the roasting system 12 during the different roasting stages. Initially, damper 24 is closed and dampers 20 and 33 are open. Green coffee beans fed into the infeed hopper 42, fall into the roasting chamber 36. A start button 71 is depressed on control panel 68 initiating the roasting process and starting motor 56. Fan 30 then forces air up through the perforated plate 37, suspending the green coffee beans on a bed of air above the bottom end of roasting chamber 36. When pressure switch 86 senses air flow, heating elements 54 are activated by electrical controller 52.

The air is heated by heating elements 54 to a sufficient temperature to begin roasting the green coffee beans 15. Smoke, tar, chaff and other pollutants are produced as the coffee beans begin to roast from the hot air. The hot air, smoke and chaff generated in roasting chamber 36 rises up into flue 40. The coffee bean chaff migrates into the chaff cyclone 60 where reduced air pressure allows the chaff to fall down into the funnel 62. The funnel 62 directs the chaff into the bucket 64. A triangular steel guide vein 4 is mounted in the roasting chamber 36 to promote the circulation of the coffee beans 15 during the roasting cycle.

The hot air and smoke are drawn by the fan 30 through cyclone pipe 61 into exhaust section 16. As the hot air expands, some of the excess air in the roasting system 12 escapes through the filters 17 and 18 to the outside environment. The remainder of the heated air is drawn by fan 30 down through open dampers 20 into air reconditioning system 43. The air is drawn through the filters 72–78 that are referred to generally as filtering system 56 and past the heating elements 54. The air filtering system 56 removes the smoke and other pollutants from the hot air and the heating elements 54 reheat the air. The fan 30 then blows the refiltered and reheated air back into roasting chamber 36.

The air filtering system 56 removes pollutants from the recirculated air during the entire roasting process. Thus, the coffee beans are roasted in air that does not alter the natural roasting aromas generated by the coffee beans 15. Since the filters 72, 74, 76 and 78 continuously filter the air during the entire roasting process, no foul odors or toxins are discharged to the outside environment when dampers 20 direct the recirculated air out into exhaust section 16.

The shape of the roasting chamber 36 improves consistency of the roasted coffee beans. The perforated plate 37 and trap-door 50 are arranged in oppositely inclining angles and form a 90 degree "V" shaped bottom end of the roasting chamber 36. The oppositely inclining side walls 60 and 61 extend up from the bottom ends of roasting chamber 36 and are aligned at approximately 20 degree angles. The dual-angled inclined sides of roasting chamber 36, in combination with the direction of hot air passing up through perforated plate 37, cause the coffee beans to tumble while circulating in an upward direction away from the side walls 60 and 61 and toward the center of roasting chamber 62.

Coffee beans can burn if they contact the hot inside walls of the roasting chamber for too long. The oppositely inclining dual-angled side walls induce tumbling in the coffee beans while bouncing the coffee beans upwards toward the center of roasting chamber 62. Since less time is spent in direct contact with the inside walls of the roasting chamber 36, the coffee beans 15 are less likely to burn. The tumbling action of the coffee beans induced by the shape of the roasting chamber side walls also provides more uniform roasting to all sides of the coffee beans.

The amount of water in green coffee beans can vary. Thus, different batches of coffee beans can require different amounts of heat to reach a specified temperature. Simply measuring the air temperature inside the roasting chamber does not accurately determine the bean temperature or, in turn, the current roasting condition of the coffee beans.

The infrared (IR) sensor 38 measures the amount of heat radiated by the coffee beans. Hot air is blown into roasting chamber 36 through air duct 32 until the coffee beans reach a preselectable temperature sensed by the IR sensor 38. Since the IR sensor 38 detects the amount of heat actually radiated from the coffee beans 15, the coffee beans 15 can be roasted to more precise temperatures, regardless of the initial water content of the green coffee beans. The IR sensor 38 also reduces the chances of coffee bean fires, by more accurately measuring the temperature of the coffee beans 15.

There is a substantial change in the weight of the coffee beans as they change from a green state to a roasted state. For example, about 20 percent of the weight of the green coffee beans is lost during the roasting process. The reduced weight of the coffee beans at the later part of the roasting process could cause some of the coffee beans to be blown out flue 40 into chaff cyclone 60. Screen 82 prevents coffee beans from being blown out flue 40. Bolts 84 detachably hold the screen 82 to the inside wall of roasting chamber 36. Thus, the screen 82 can be periodically removed for easy cleaning.

If the screen 82 gets clogged with tar and chaff, the air pressure in roasting chamber 36 increases. The pressure sensor 80 detects when the air in chamber 36 reaches a preselected pressure which indicates the screen 82 is clogged. A signal from pressure sensor 80 activates one of the light 69 on the control panel 68 and prevents the roasting system 12 from restarting until the screen 82 is cleaned.

During the roasting process the damper 33 is used to control the air pressure into roasting chamber 36. During a first roasting stage, the green coffee beans are relatively heavy and the air circulating through the roasting system 12 is relatively cool. The damper 33 is automatically adjusted by piston 31 so that the resulting air pressure fully circulates the green coffee beans in roasting chamber 36.

After a preselected amount of time, or after the coffee beans reach a preselected temperature, the angle of damper 33 is varied, changing the amount of air pressure exerted by fan 30 into roasting chamber 36. As the air temperature in the roasting system 12 increases, more air pressure is needed to ensure that the beans 15 continue to fully circulate in roasting chamber 36. Thus, the damper 33 is rotated to a more open position in air duct 32. However, the damper 33 still restricts the maximum amount of air pressure so that the beans 15 are not blown out through flue 40. Thus, the damper 33 allows more air pressure control during the roasting process for more evenly roasted beans and at the same time preventing the beans from being blown out of flue 40.

After the roasting process is completed, the roasted coffee beans typically sit in the bottom of the roasting chamber for a certain amount of time. The heat radiated from the inside walls of the roasting chamber can burn the beans or change the roasting composition of the coffee beans. If not cooled down quickly, the coffee beans will also take on an undesirable baked flavor. In a conventional air roasting system, a scoop is used to rake the roasted coffee beans out from a side door in the roasting chamber. Removing small portions of the beans at a time with a scoop allows some coffee beans to remain in the chamber longer than others, causing non-uniform roasting. Manually scooping the roasted coffee beans from the chamber is also labor intensive and can burn the hands of the operator.

To prevent additional baking, an improved cool-down technique is used in the roasting system 12. When the IR sensor 38 detects that coffee beans have reached a preselected temperature, the heating elements 54 are shut-off. The dampers 20 are opened, venting the hot recirculated air into exhaust section 16.

The damper 24 is opened and at the same time that a water spray 29 from nozzle 34 is activated, allowing the fan 41 to blow cooler ambient air into roasting chamber 36. The water spray 29 is activated for a preset time period, and then shut off. The combination of cool ambient air through damper 24 and the water spray 29 from nozzle 34 quickly cools down the roasted coffee beans 15. Thus, the beans do not continue to roast after reaching the selected temperature. Automatically activating the water spray 29 onto the roasted coffee beans for a predetermined time ensures that the coffee beans are cooled down at the same time during each coffee roast and improves the reproducability for each roasting session.

The nozzle 34 is located in air duct 32, at the point of entry of air into roasting chamber 62. The atomized water 37 is blown upwards into chamber 62 in the direction 5 of air recirculation. The location of the nozzle 34 below roasting chamber 62 disperses the water 37 more evenly among the coffee beans. The location below roasting chamber 62 also prevents the nozzle 34 from clogging due to tar and other pollutants.

The coffee beans 15 continue to cool down to a second drop-out temperature measured by infrared sensor 38. After the coffee beans reach the drop-out temperature, the fan 30 is shut off. The trap-door 50 is then pulled down and away from the bottom end of roasting chamber 36 by piston 90. All the roasted coffee beans 15 immediately fall out of the roasting chamber 36 at the same time through discharge chute 46 and into receiving bucket 48. Thus, the coffee beans 15 do not continue to cook in the bottom of roasting chamber 36. In turn, the coffee beans 15 maintain a more uniform roasted consistency. The trap-door 50 and discharge chute 46 also eliminate the need for manual removal of the coffee beans 15 from roasting chamber 36.

The infeed door 41 is automatically opened by piston 45 after an amount of time sufficient for the roasted coffee beans to discharge from the roasting chamber 36 and for the trap door 50 to be automatically reclosed by piston 90. Another roasting session can then begin in the roasting system 12.

The roasting system 12 can be used for roasting any food product and particularly food products that emit gases, smoke, chaff or any other pollutants during the roasting process. For example, the roasting system 12 is equally efficient in roasting nuts.

Because of the substantial amount of pollutants generated, coffee roasting systems are typically large and are operated in heavy industrial environments. Therefore, coffee roasting is usually performed in remote locations away from the coffee shops that actually brew the coffee. Large batches of roasted coffee beans are then delivered to the coffee shops at periodic times. Because roasted coffee beans have a limited shelf life, old roasted coffee beans often have to be thrown away. The present invention allows small coffee roasting systems to be located in any retail store or coffee shop. The green coffee beans can be stored and then roasted on-demand guaranteeing fresher coffee brews. Small batches of coffee beans can be roasted, eliminating waste from roasting large batches of coffee beans at the same time.

The roasting system is shown in the context of a fluid bed system. However, the air reconditioning system, infrared sensor and other components of the invention can also be implemented into drum roasters and other roasting systems.

Having described and illustrated the principles of the invention in a preferred embodiment thereof, it should be apparent that the invention can be modified in arrangement and detail without departing from such principles. We claim all modifications and variation coming within the spirit and scope of the following claims.

We claim:

1. A fluid bed roasting system, comprising:
    a roasting chamber having an air infeed vent for receiving air and a flue for directing exhaust air from the roasting chamber; and
    an air reconditioning system coupled between the flue and the air infeed vent including:
        a heater for heating the air after the air has passed through the roasting chamber and the flue;
        an air filtering system for removing pollutants from the exhaust output from the roasting chamber flue; and
        a fan coupled between the heater and roasting chamber infeed vent drawing the exhaust air from the roasting chamber, passing the exhaust air through the air filtering system and past the heater and recirculating the filtered and reheated air back into the roasting chamber through the air infeed vent,
        the same recirculated filtered and reheated air blown up by the fan through a bottom end of the roasting chamber providing a fluid bed of air that both suspends and circulates a food product inside the roasting chamber while the air at the same time roasts the food products.

2. A roasting system according to claim 1 including an infrared sensor coupled to a top end of the roasting chamber and pointing away from the air infeed vent for sensing radiated heat emitted by the food product while circulating up inside the top end of the roasting chamber.

3. A roasting system according to claim 1 including an exhaust section coupled between the roasting chamber and the air filtering system.

4. A roasting system according to claim 3 including an exhaust damper hinged between the exhaust section and the air filtering system for selectively directing the recirculated air to the air filtering system.

5. A roasting system according to claim 4 wherein the exhaust section includes a vent and a filter covering the vent.

6. A roasting system according to claim 4 including an ambient air damper fluidly coupled to the fan and located between the air filtering system and the air infeed vent, the ambient air damper selectively directing ambient air from outside the roasting system into the roasting chamber for cooling the food product after roasting.

7. A roasting system according to claim 1 including a spray system having a nozzle located in the air infeed vent for spraying water up through the air infeed vent into the bottom end of the roasting chamber, the recirculated air pushing the water upward into the roasting chamber while the recirculated air continues to circulate the food product.

8. A roasting system according to claim 1 wherein the bottom end of the roasting chamber includes oppositely inclining bottom sides each aligned at a first angle and oppositely inclining side walls extending up from the bottom sides and aligned at a second angle different than the first angle, the bottom sides and side walls causing the food product to tumble inside the chamber as the recirculated air lifts and roasts the food product upward in the roasting chamber.

9. A roasting system according to claim 1 including a trap-door pivotally coupled to a bottom end of the roasting chamber.

10. A roasting system according to claim 9 including a discharge chute covering the trap-door and extending downward from the roasting chamber.

11. A roasting system according to claim 1 wherein the air filtering system comprises a first coarse particulate removing filter processing the exhaust from the roasting chamber and a second finer particulate removing filter removing finer particulates passing through the first coarse particulate removing filter.

12. A roasting system according to claim 11 wherein the first filter comprises a fiberglass filter, the second filter comprises an electronic filter, and including a third carbon filter for removing odors from filtered exhaust from the first and second filter.

13. A roasting system according to claim 1 including air ducts coupled between the roasting chamber, air reconditioning system and fan for sealing the entire roasting system and selectively preventing discharge of exhaust outside the roasting system.

14. A roasting system according to claim 11 including multiple pressure sensors for sensing pressure differentials on either side of both the first and second filter wherein high pressure differential indications individually identify which of the first and second filters are clogged.

15. A roasting system for roasting coffee beans, comprising:
  a roasting chamber having an air infeed vent at a bottom end for receiving air and an exhaust flue for directing exhaust air from the roasting chamber;
  a heating system including a fan continuously pulling the air from the roasting chamber, through the heating system and continuously forcing the air reheated by the heating system up through the infeed vent;
  an infrared sensor coupled inside a top end of the roasting chamber and pointed toward the top end of the roasting chamber for sensing the amount of heat radiated by the coffee beans while being circulated at the top end of the roasting chamber thereby detecting a more uniform roasting temperature of the coffee beans.

16. A roasting system according to claim 15 including a fan, an exhaust damper coupled between the exhaust flue and the heating system and an ambient damper coupled between the heating system and the air infeed vent, the exhaust damper when opened allowing the fan to recirculate hot air heated by the heating system up through the air infeed vent causing the coffee beans to circulate and roast inside the roasting chamber on a bed of air and the exhaust damper when closed and the ambient air damper open shutting off the recirculated air and allowing the same fan to blow only cool ambient air into the roasting chamber.

17. A roasting system according to claim 16 including a triple stage air filtering system coupled between the heating system and the exhaust flue having a first course particulate removing filter, a second fine particulate removing filter, and a third odor removing filter; the triple stage air filtering system, heating system and fan forming a substantially airtight air reconditioning system that prevents exhaust generated by the roasting chamber into the outside environment and sending filtered reheated air back into the roasting chamber.

18. A roasting system according to claim 15 including a screen attached inside the roasting chamber at least partially over the exhaust flue preventing the coffee beans from being blown out through the exhaust flue while being circulated in the roasting chamber.

19. A roasting system according to claim 16 including a damper located between the fan and the infeed vent selectively controlling an amount of air pressure exerted into the roasting chamber by the fan to maintain a constant circulation in the roasting chamber independently of changing water content in the coffee beans during the roasting process.

20. A roasting system according to claim 15 including a guide vein mounted in the roasting chamber for controlling circulation of the recycled air blown in from the infeed vent.

21. A method for roasting coffee beans, comprising:
  locating a batch of coffee beans in a roasting chamber;
  blowing air through a bottom end of the roasting chamber causing the coffee beans to circulate;
  roasting the coffee beans by heating the air blown into the roasting chamber, the roasting coffee beans generating smoke;
  measuring the radiated temperature of the coffee beans while being circulated in a top portion of the roasting chamber using an infrared sensor;
  drawing the heated air and smoke from the roasting chamber;
  filtering the smoke from the heated air used for roasting the coffee beans;
  reheating the filtered air; and
  recirculating the reheated air back into the roasting chamber until the coffee beans reach a preselected temperature.

22. A method according to claim 21 including discharging the recirculated air out from the roasting chamber into an outside environment and directing non-recirculated air from the outside environment into the roasting chamber when the coffee beans reach the preselected temperature.

23. A method according to claim 21 including automatically spraying water up through the bottom end of the roasting chamber when the coffee beans reach the preselected temperature.

24. A method according to claim 21 including the following steps:
  discontinuing heating the air when the coffee beans reach the preselected temperature; and
  automatically discharging the coffee beans from the roasting chamber when the temperature of the coffee beans drop down to a second drop-out temperature.

25. A method according to claim 21 wherein the air blowing step further comprises:

blowing air into the roasting chamber at a first pressure during a first coffee bean roasting stage; and blowing air into the roasting chamber at a second pressure during a second coffee bean roasting stage so as to maintain a substantially constant circulation of the coffee beans in the roasting chamber without blowing the coffee beans out the exhaust flue.

26. A method for roasting coffee beans, comprising:

locating a batch of coffee beans in a roasting chamber;

blowing air through a bottom end of the roasting chamber at a first pressure during a first coffee bean roasting stage; and blowing air through a bottom end of the roasting chamber at a second pressure during a second coffee bean roasting stage to maintain substantially constant circulation of the coffee beans in the roasting chamber without blowing the coffee beans out an exhaust flue;

roasting the coffee beans by heating the air blown into the roasting chamber, the roasting coffee beans generating smoke;

drawing the heated air and smoke from the roasting chamber;

filtering the smoke from the heated air used for roasting the coffee beans;

reheating the filtered air; and recirculating the reheated air back into the roasting chamber until the coffee beans reach a preselected temperature.

27. A method according to claim 26 including discharging the recirculated air out from the roasting chamber into an outside environment and directing non-recirculated air from the outside environment into the roasting chamber when the coffee beans reach the preselected temperature.

28. A method according to claim 26 including measuring the radiated temperature of the coffee beans while being circulated in a top portion of the roasting chamber using an infrared sensor.

29. A method according to claim 26 including automatically spraying water up through the bottom end of the roasting chamber when the coffee beans reach the preselected temperature.

30. A method according to claim 26 including the following steps:

discontinuing heating the air when the coffee beans reach a preselected temperature; and automatically discharging the coffee beans from the roasting chamber when the temperature of the coffee beans drop down to a second drop-out temperature.

* * * * *